United States Patent

Olaniran et al.

[11] Patent Number: 5,135,587
[45] Date of Patent: Aug. 4, 1992

[54] MACHINABLE, STRONG, BUT CRACKABLE LOW DUCTILITY STEEL FORGING

[75] Inventors: Moses A. Olaniran, Dearborn; Charles A. Stickels, Ann Arbor, both of Mich.

[73] Assignee: Ford Motor Company, Dearborn, Mich.

[21] Appl. No.: 678,516

[22] Filed: Apr. 1, 1991

[51] Int. Cl.$^5$ ............................................ C22C 38/04
[52] U.S. Cl. ................................... 148/320; 420/87
[58] Field of Search ............................ 148/320; 420/87

[56] References Cited

U.S. PATENT DOCUMENTS

| | | | |
|---|---|---|---|
| 1,831,325 | 11/1931 | Short | 384/279 |
| 2,371,400 | 3/1945 | Mantle | 74/579 E |
| 2,553,935 | 5/1951 | Parks et al. | 74/579 E |
| 4,071,381 | 1/1978 | Dunkerley et al. | 148/320 |
| 4,575,397 | 3/1986 | Heller | 148/320 |
| 4,693,139 | 9/1987 | Mokai et al. | 74/579 E |
| 5,055,253 | 10/1991 | Nelson | 420/87 |

FOREIGN PATENT DOCUMENTS 0197524 8/1990 Japan .

Primary Examiner—Deborah Yee
Attorney, Agent, or Firm—Joseph W. Malleck; Roger L. May

[57] ABSTRACT

A crackable forging steel with excellent machinability and low ductility consisting of (by weight percent): 0.6–0.75 carbon, 0.25–0.5 manganese, 0.04–0.12 sulfur, and the remainder essentially iron except for up to about 1.2% residual impurities selected from the group consisting of phosphorous, silicon, nickel, vanadium, copper, chromium, and molybdenum, the manganese/sulfur ratio being greater than 3.0 and the microstructure of said alloy being substantially 100% pearlite with a grain size grade between 3–8 according to ASTM Specification E112-88.

A method of making a connecting rod with such steel comprising: (a) forging a rod of such steel; (b) cooling the forging to ensure essentially a 100% pearlitic microstructure and a grain size of 3–8 ASTM per Specification E112-88; (c) fracturing the rod into cap and body portions; (d) reassembling by use of bolts which have a clearance no greater than 0.04 inch to guide the fractured surfaces to within 0.002 inch of their original integration and thereafter, while the cap and body portions are free to laterally adjust, applying a clamping load through the bolts to force the fractured ridges into exact rematch.

6 Claims, 5 Drawing Sheets

```
┌─────────────────────────────────────┐
│ FORGE ONE-PIECE ROD OF CARBON STEEL │
│ HAVING UNIQUE CARBON, MANGANESE,    │
│      AND SULPHUR CHEMISTRY          │
└─────────────────────────────────────┘
                  │
┌─────────────────────────────────────┐
│ COOL STEEL FROM FORGING TEMPERATURE │
│  TO BE 100% PEARLITIC AND HAVE      │
│      GRAIN SIZE OF 3-8 ASTM         │
└─────────────────────────────────────┘
                  │
┌─────────────────────────────────────┐
│       PROVIDE BOLT OPENINGS TO      │
│  ENABLE SECURMENT OF THE CRACKED    │
│              PORTIONS               │
└─────────────────────────────────────┘
                  │
┌─────────────────────────────────────┐
│ FRACTURE ROD INTO PORTIONS LATERALLY│
│   ACROSS BOTH SIDES OF ROD ABOUT BIG│
│  BORE, BY APPLICATION OF SUSTAINED TENSION │
└─────────────────────────────────────┘
                  │
┌─────────────────────────────────────┐
│ REASSEMBLE BY INSERTION OF BOLTS THAT│
│ INITIALLY ACHIEVES REMATING OF PORTIONS│
│  WITHIN .002" OF ORIGINAL INTEGRATION AND│
│   THEREAFTER APPLYING CLAMPING LOAD │
│    THROUGH BOLTS THAT ARE AT LEAST  │
│   EFFECTIVE TO FORCE CRACKED RIDGES OF│
│    THE PORTIONS TO LATERALLY SHUFFLE│
│   UNDER SUCH PRESSURE CONTRIBUTING TO│
│           AN EXACT REMATCH          │
└─────────────────────────────────────┘
```

*Fig. 2*

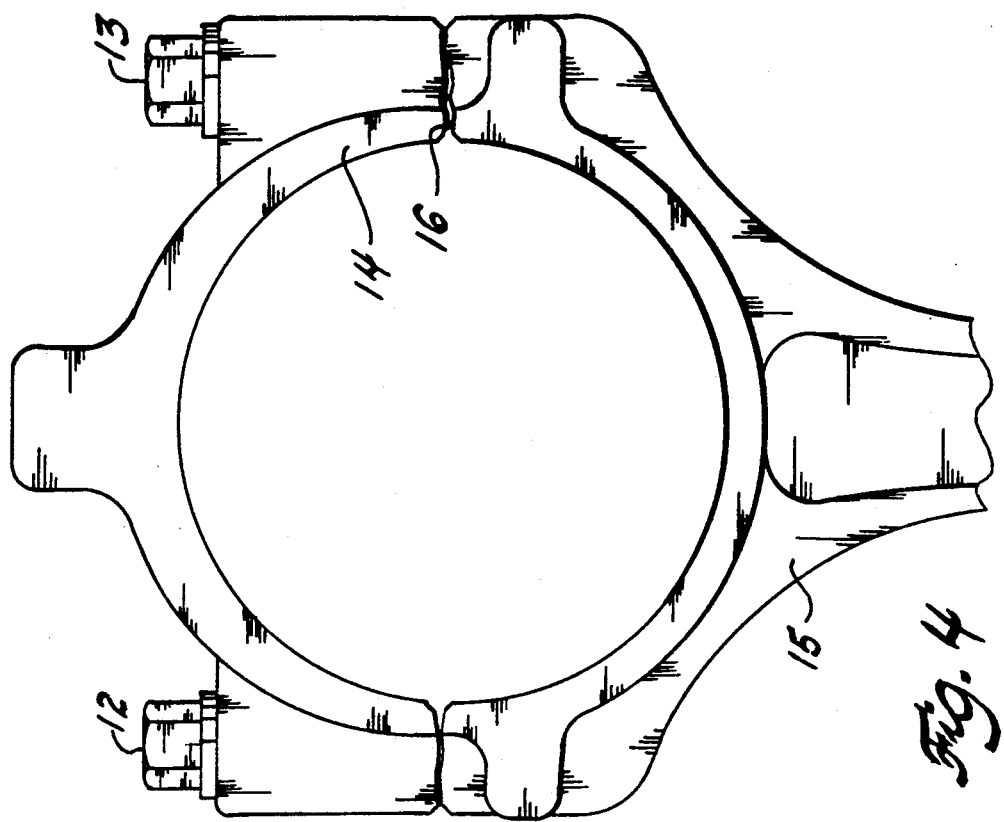
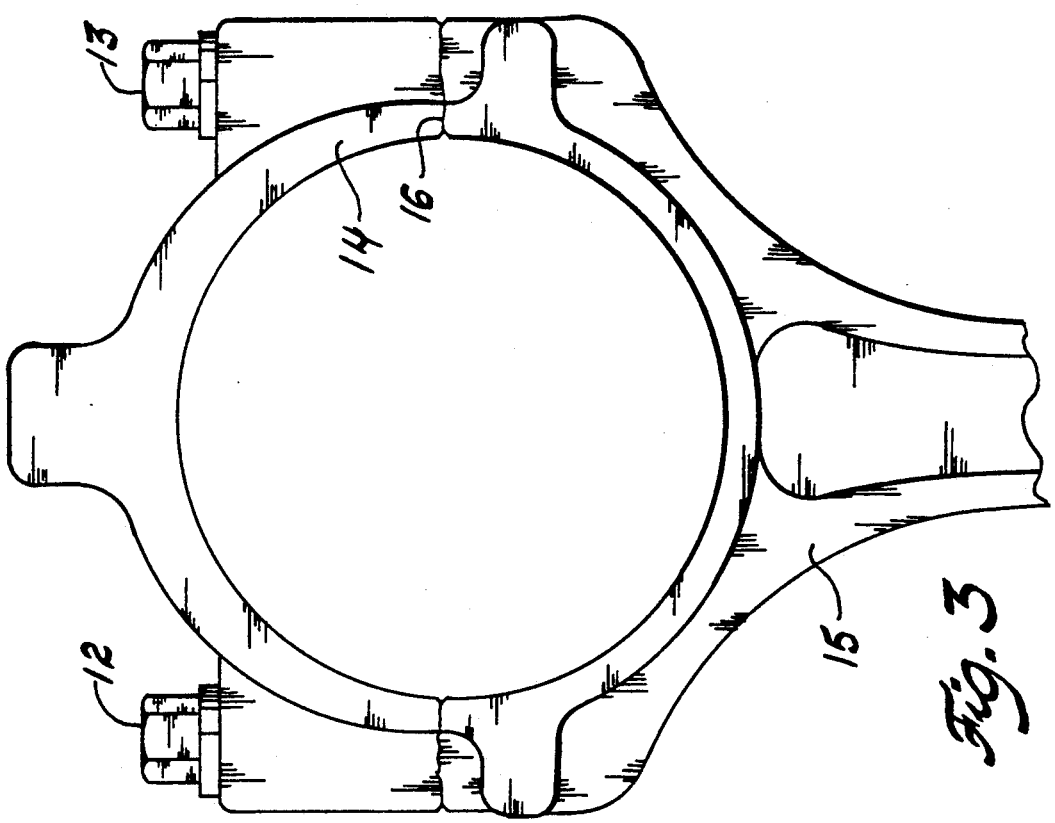

MACHINABLE, STRONG, BUT CRACKABLE LOW DUCTILITY STEEL FORGING

BACKGROUND OF THE INVENTION

1. Technical Field

This invention relates to the art of making bipartite connecting rods by cracking, and more particularly to forgeable wrought steel materials which enhance the characteristics of the connecting rod as well as facilitate cracking.

2. Discussion of the Prior Art

Connecting rods have been made bipartite for some time by sawing the enlarged end of a connecting rod into two pieces and reassembling the sawed pieces with bolts (see U.S. Pat. Nos. 1,831,325 and 2,371,400). Fracturing is a more attractive alternative because it allows the irregular jagged ridges on the cracked plane to facilitate more exact rematching of the pieces. One of the earliest patented approaches to cracking forged wrought steel rods is disclosed in U.S. Pat. No. 2,553,935 (Parks et al, 1951). The steel used for such cracked connecting rods was strong, tough, and ductile, usually containing 0.4-0.5 carbon with alloying elements added to improve hardenability if the part is to be quenched and tempered and sulfur added to improve machinability in many cases. Examples of such alloys are SAE 1151, 1141, and 1541; 1151 is a resulfurized grade that contains essential elements of (by weight percent): 0.48-0.55, carbon, 0.70-1.00 manganese, 0.04 max. phosphorous, 0.08-0.13 sulfur, and the remainder being essentially iron except for about 1% other residuals; 1141 is also a resulfurized alloy containing similar amounts of sulfur, phosphorus, and residual elements, but with a lower carbon content, 0.37-0.45%, and a higher manganese content, 1.35-1.65; 1541 has essentially the same composition as 1141 except that it is not resulfurized, having a content of 0.05 max. and has a tempered martensite microstructure. SAE 1151 is used for connecting rods which are air-cooled to a ferrite-pearlite microstructure after forging. 1141 and 1541 have better hardenability, conferred by the higher manganese content, and are used when rods are to be quenched and tempered. Regardless of the above alloy chosen, connecting rods are typically made to a hardness range of 76-88 HRG (16-26 HRC) to facilitate subsequent machining after heat treatment. In this hardness range, typical tensile values for any of these alloys are; tensile strength 100-125 ksi, yield strength 75-95 ksi, elongation 18-28%, and a charpy impact value of 60-100 ft/lbs.

Since wrought steel forging connecting rods heretofore have not been inherently brittle, some technique must be used to weaken the material at least in the cracking plane. To encourage cracking of such ductile wrought steel in the Parks et al patent, the cross-sectional area of the cracking plane was reduced by saw kerfs and drilled holes. This avoided using heat treatment to make such ductile steels more brittle which would discourage ease of subsequent finish machining and would degrade the toughness of the connecting rod. Other brittlyzing techniques were avoided, such as the use of cryogenics which proved to be exorbitantly expensive. An extension of the Parks idea of reducing the cross-sectional area is also shown in a later U.S. Pat. No. 4,693,139, employing dual V-notches.

Cracking of such ductile rods has been attempted by a variety of techniques, such as (i) use of a wedge-actuated, expandable mandrel, fitting within the large bore of the connecting rod, to apply tension across a predetermined plane perpendicular to the longitudinal axis of the rod, (ii) use of conical force fingers jammed into holes along the cracking plane, (iii) use of single-step, continuous pull-apart fixtures, or (iv) use of impact against the side of the rod.

What is needed is a crackable low ductility steel forging alloy that retains all of the other advantages of good machinability, strength, and toughness, characterized by the SAE 1151, 1141, and 1541 steels. Applicants are unaware of any steel alloy that has been specifically formulated to enhance crackability of forged wrought steel connecting rods.

SUMMARY OF THE INVENTION

This invention, in a first aspect, is a crackable forging steel that has excellent machinability, but low ductility, and consists of (by weight percent): 0.6-0.75 carbon, 0.25-0.5 manganese, 0.04-0.12 sulfur, and the remainder essentially iron except for up to 1.2% residual impurities selected from the group consisting of phosphorous, silicon, nickel, vanadium, copper, chromium, and molybdenum; the manganese/sulfur ratio is greater than 3.0 and the microstructure of said alloy is substantially 100% pearlite having a grain size grade between 3-8 per ASTM standards.

Residual impurities may be allowed to the following limits (by weight percent): up to 0.2 nickel, 0.02 max. Mo, 0.1 max. Cr, 0.15 max. Cu, 0.035 max. V, 0.15-0.35 Si, and 0.03 max. P. The steel will have a hardness in the range of 76-88 HRG, ductility, as measured by distortion of the circular crank opening in a connecting rod after cracking, of 0-0.005 inches, and a machinability comparable to that obtained with SAE 1151 or 1541 steels of similar hardness measured by the resulting wear and longevity of tools used to machine such steel and a fatigue strength which on average is 5-10% stronger than an equivalent 1151 steel.

In a second aspect of this invention, it comprises a method of making a cracked wrought steel connecting rod comprising essentially the following steps: (a) forging a one-piece connecting rod of a steel that consists of (by weight percent): 0.6-0.75 carbon, 0.25-0.5 manganese, 0.04-0.12 sulfur, with the remainder being essentially iron except for up to 1.2% residual impurities, the steel having a manganese/sulfur ratio exceeding 3.0 and a substantially 100% pearlitic microstructure; (b) cooling the steel from the forging temperature to ensure a grain size in the range of 3-8 per ASTM Specification E112-88; (c) providing bolt fastening openings on each side of said connecting rod to permit securement together of the cracked portions; (d) fracturing the connecting rod into cap and body portions, said fracturing being carried out by applying tension across a cracking plane generally perpendicular to the longitudinal axis of the connecting rod and intersecting both rod sides; and (e) reassembling the cap and body portions by insertion of bolts into said bolt openings with a clearance no greater than: 0.04 inch to achieve guidance of the fractured surfaces to within 0.002 inch of their original integration and thereafter, while the cap and body portions are free to laterally adjust, applying a clamping load through said bolts which forces the ridges of said fractured surfaces to laterally shuffle under such pressure, guiding the surfaces into an exact rematch.

Preferably, the forging temperature is in the range of 1900°–2300° F., and the heated steel is not only air-quenched in an ambient environment but exposed to a relatively fast cooling characterized by the chilling effect of the still air. It is important that the steel be cooled at a rate slow enough so that the transition to pearlite takes place at a temperature above 1000° F., thereby assuring formation of a microstructure consisting of essentially 100% coarse pearlite of the desired hardness.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 2 is a block diagram of the method used to make a cracked connecting rod employing the steel of this invention;

FIGS. 3 and 4 are comparative elevational views of connecting rods, one of which is employed in this invention and the other is a conventional steel;

DETAILED DESCRIPTION AND BEST MODE

Figure 1:
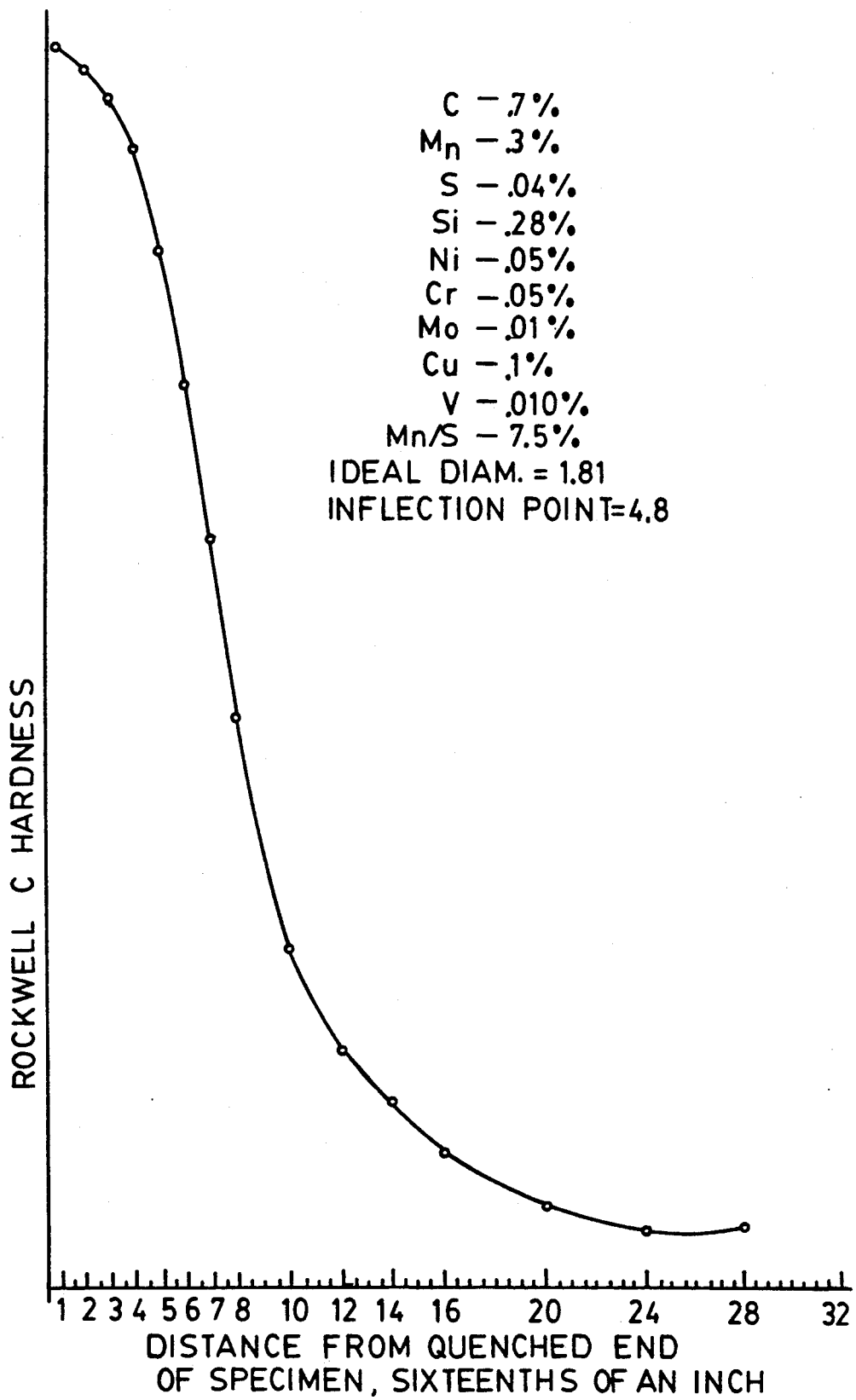
FIG. 1 is a graphical illustration of hardenability of the inventive steel.
Figure 6:
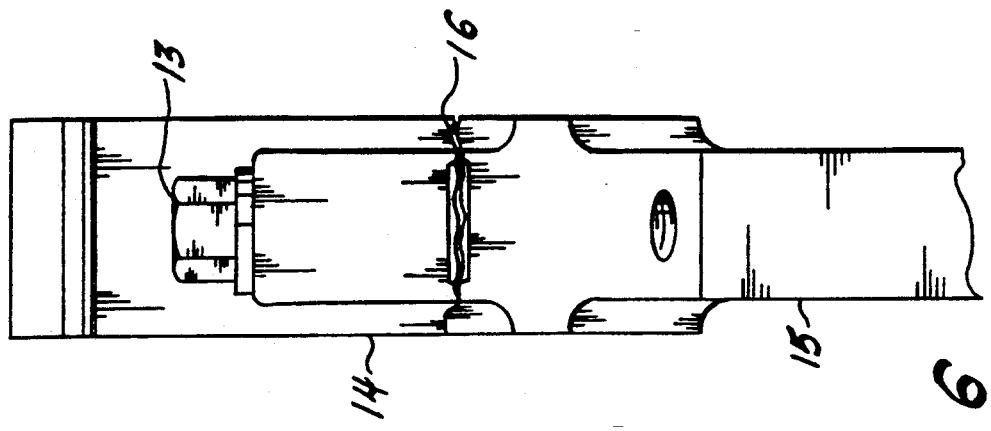
FIGS. 5 and 6 are comparative perspective views of connecting rods, one of which is made in accordance with this invention and the other is of conventional steel.
Figure 5:
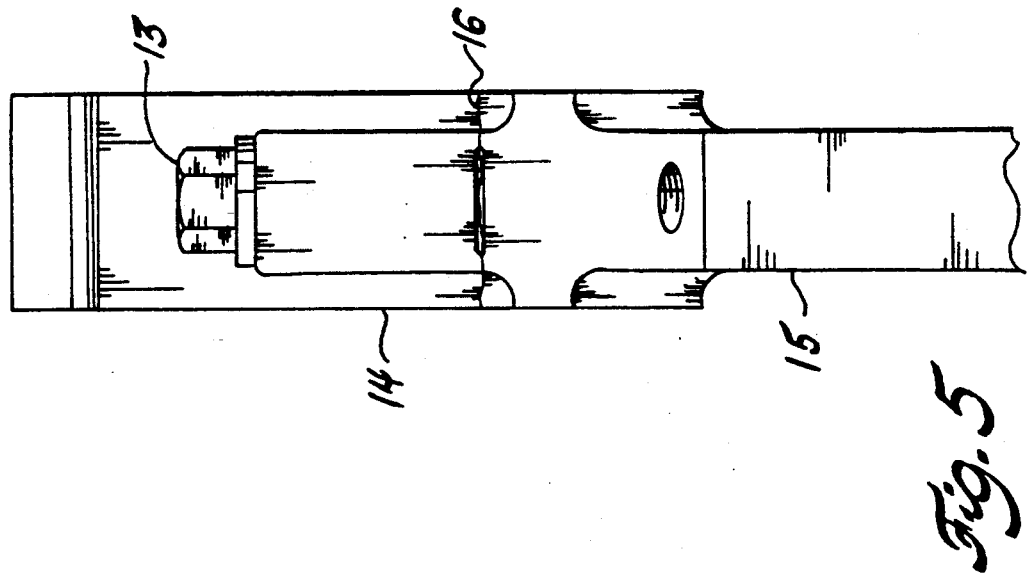

The unusual combination of characteristics achieved by the subject steel include: (i) an ability to flow easily during forging; (ii) a reduced ductility after forging allowing the forging to perform admirably in a cracking process; and (iii) the same hardness and thus machinability as conventional forging steels or alloys.

Crackable wrought steel forging metal, which achieves the characteristics outlined above, consists of (by weight percent): 0.60–0.75 carbon, 0.25–0.50, manganese, 0.04–0.12 sulfur, a Mn/S ratio greater than 3.0, with residual impurities up to 1.2% and the remainder being essentially iron. The wrought steel forging metal has essentially a 100% pearlitic microstructure with a grain size in the range of 3–8 grades according to ASTM Specification E112-88.

The steel can be cast in ingots after melting in open-hearth or basic oxygen furnaces or cast from continuous steelmaking. The wrought steel forging metal herein is readily forgeable requiring the same type of forces used to forge typical forging steels such as SAE 1151, 1141, and 1541.

Ductility is lowered because the increased carbon content provides a microstructure of essentially 100% pearlite that facilitates subsequent crackability; however, the higher carbon content would lead to higher hardness, harming machinability, if there is no compensation. Ductility can be measured as distortion of the circular crank hole in the connecting rod which occurs as a result of cracking which, in this invention, will range from 0 to 0.005 inches. With other typical forging metals, the distortion (elongation of the crank opening) will be on the order of 0.04 inches. Ductility is also measured by charpy impact values which, in the case of this inventive metal, is in the range of 40–80 ft/lbs; this allows the metal to react easily to tension forces. Charpy impact values for 1151, 1141, and 1541 steel is in the range of 60–100 ft/lbs.

The loss in machinability due to the hardness increase expected from increased carbon is offset by reducing the manganese content and slowing the cooling rate, thereby promoting formation of a softer, coarser pearlite upon cooling from the forging temperature. The resulting hardness after cooling from the forging temperature will be in the range of 76–88 Rockwell G scale, preferably 80–86 Rockwell G. The machinability is additionally enhanced by the addition of a considerable amount of sulfur in relation to the manganese. The machinability can be measured in terms of how long a cutting tool will last in carrying out a standardized machining operation.

The wrought steel herein is of a hybrid chemical content. It has a sulfur content overlapping similar to the range in SAE 1151, a manganese content overlapping that in a 1078 steel, and a carbon content the same as in a 1069 steel. It is this content combination along with the type of processing herein that produces the characteristics sought.

Residual impurities present come from the group consisting of P, Si, Ni, V, Cu, Cr, and Mo, with each being limited preferably to the following limits (maximum percent by weight): 0.2 Ni, 0.02 Mo, 0.1 Cr, 0.15 Cu, 0.35 V, 0.15–0.35 Si, and 0.03 P.

As the carbon falls below 0.6%, more ferrite forms upon air cooling, increasing the ductility and reducing crackability. If the carbon exceeds 0.75%, hypereutectoid carbides from, raising the hardness and adversely affecting machinability. Manganese of at least 0.25%, and a Mn/S ratio of at least 3.0 are needed to assure formation of MnS, avoiding hot shortness. Manganese above 0.5% will increase the hardenability, making it difficult to obtain the desired hardness upon air cooling after forging. Sulfur of at least 0.04% is desired to enhance machinability, but as the sulfur content increases beyond 0.12%, the danger of encountering seams in the bar stock (due to cracking during hot rolling) increases. There is also concern that very high sulfide contents may lead to surface defects in the forgings.

As shown in FIG. 2, the preferred method of making a cracked wrought steel connecting rod of this invention comprises the steps of: (a) forging a one-piece steel connecting rod blank consisting of the above carbon steel metal; (b) cooling the steel forging from its forging temperature to ensure essentially a 100% pearlitic microstructure and a grain size in the range of 3–8 ASTM grades per Specification E112-88; (c) providing bolt fastening openings on each side of the connecting rod to permit securement of the cracked portions of the rod; (d) fracturing the connecting rod into a cap and body portion by applying tension across the cracking plane generally perpendicular to the longitudinal axis of the connecting rod and intersecting both sides of the rod; and (e) reassembling the cap and body portions by insertion of bolts into their openings with a clearance no greater than 0.04 inch to achieve guidance of the fractured surfaces to within 0.002 inch of their original integration and thereafter, while the cap and body portions are free to laterally adjust, applying a clamping load through the bolts to force the ridges of the fractured surfaces to laterally shuffle under such pressure contributing to an exact rematch.

The forging temperature in step (a) is in the range of 1900°-2300° F. The cooling in step (b) is carried out by exposing the metal forging to still, ambient air to maintain the metal at a temperature above 1000° F. for sufficient time to allow transformation to pearlite (typically less than 15 minutes) and thereafter cooled below 1000° F. at any convenient rate. One treatment which has proved satisfactory involves interrupting the natural cooling in air by placing hot, as-forged parts in a furnace set at 1000° F. for 15 minutes, then cooling in ambient air to room temperature. Whether or not interrupted cooling is required will depend on the size of the part as well as the specific heat composition of the alloy.

Figure 7:
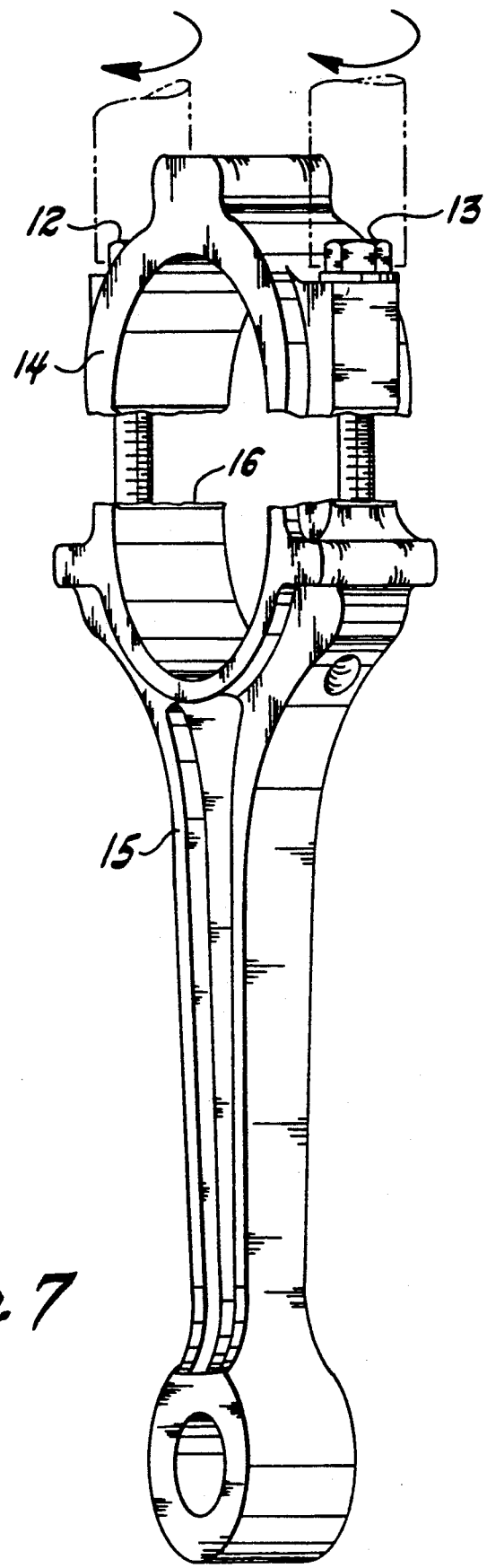
FIG. 7 is a perspective view of a cracked rod cracked under the reassembly step of the method of FIG. 2.

A series of metal connecting rod samples were prepared and cracked to form bipartite rods. Each of the forgings had stress-riser grooves 10, 11 machined into the internal surfaces as shown in FIGS. 3-6. The chemistry of the samples was varied to demonstrate the limits of this invention and the processing was also varied for some of the samples to determine the effect of cooling rate. All samples had other elements (impurities) controlled to about 1%. The inventive procedure for cooling rate comprised delayed cooling at 1000° F. for 15 minutes and thereafter air cooling at ambient room temperature (still air). The effect of chemical variations and processing was determined by observing and correlating changes in the microstructure with differences in crackability (or ductility) and machinability measured by chip friability and tool life. The results of such tests are presented in Table A. Each of the cracked portions of the rod were reassembled as in FIG. 7 using only torquing of bolts 12, 13 while the cap 14 and body 15 were free to laterally adjust. Clamping load is applied to the microsized ridges 16 on the cracked plane to first slide them against opposite ones (as mating inclined surfaces being moved along one another) to promote a more exact rematch and eventual yielding of the ridges if the clamping load is sufficiently high.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

TABLE A

| Sample | C | Mn | S | Cooling Rate | Microstructure | Machinability | Hardness $R_g$ | Elongation at cracked plane (inches) |
|---|---|---|---|---|---|---|---|---|
| 1 | .7 | .4 | .08 | inventive procedure | 100% pearlitic | good | 82 | .0005 |
| 2 | .75 | .5 | .12 | inventive procedure | 100% pearlitic | good | 85 | .0005 |
| 3 | .6 | .25 | .04 | inventive procedure | 100% pearlitic | good | 81 | .0005 |
| 4 | .8 | .4 | .08 | inventive procedure | 100% pearlitic | poor | 90 | .0003 |
| 5 | .3 | .4 | .08 | inventive procedure | mixed | good | 72 | .020 |
| 6 | .7 | .7 | .08 | inventive procedure | pearlite | poor | 90 | .008 |
| 7 | .7 | .01 | .08 | inventive procedure | pearlite | excellent | 73 | .01 |
| 8 | .7 | .4 | .2 | inventive procedure | pearlite | good | 78 | .0009 |
| 9 | .7 | .4 | .08 | quench (fast cooling) | pearlite, ferrite, and carbides | poor | 94 | .00 |
| 10 (1541) | .42 | 1.41 | .02 | inventive procedure | ferrite and pearlite | poor | 94 | .010 |
| 11 (1151) | .5 | .75 | .10 | inventive procedure | ferrite and pearlite | good | 82 | .019 |
| 12 (1141) | .38 | 1.4 | .09 | inventive procedure | ferrite and pearlite | poor | 93 | .009 |
| 13 (1040) | .4 | .6 | .03 | inventive procedure | ferrite and pearlite | fair | 90 | .010 |

We claim:

1. A forgeable crackable wrought steel, consisting of (by weight percent): 0.6-0.75 carbon, 0.25-0.5 manganese, 0.04-0.12 sulfur, Mn/S>3.0, and the remainder essentially Fe except for up to about 1.2% residual impurities, said steel being essentially 100% pearlitic with a grain size in the range of 3-8 grades according to ASTM Specification E112-88 and has reduced ductability with increased machinability.

2. The steel as in claim 1, in which said impurities are selected from the group consisting of P, Si, Ni, V, Cu, Cr, and Mo.

3. The steel as in claim 2, in which said residual impurities are individually controlled to the following limits (by weight percent): 0.2 max. Ni, 0.02 max. Mo, 0.1 max. Cr, 0.15 max. Cu, 0.035 max. V, 0.15-0.35 Si, and 0.03 max. P.

4. The steel as in claim 1, which is further characterized by a hardness in the range of 76-88 HRG and a machinability substantially equal to or better than SAE 1151, 1141, or 1541 steels.

5. The steel as in claim 1, which is further characterized by a ductility measured as elongation at the cracked plane, which elongation is no greater than 0.005 inch.

6. The steel as in claim 1, in which said carbon is 0.71%, Mn 0.5%, and S 0.003%.

* * * * *